(12) United States Patent
Düppre

(10) Patent No.: US 7,592,552 B2
(45) Date of Patent: Sep. 22, 2009

(54) WEIGHING DEVICE, ESPECIALLY LOAD CELL FOR A COMBINATION SCALE

(75) Inventor: Theo Düppre, Kaiserslautern (DE)

(73) Assignee: Wipotec Wiege- und Positioniersysteme GmbH, Kaiserslautern (DE)

(*) Notice: Subject to any disclaimer, the term of this patent is extended or adjusted under 35 U.S.C. 154(b) by 29 days.

(21) Appl. No.: 11/849,722

(22) Filed: Sep. 4, 2007

(65) Prior Publication Data
US 2008/0053712 A1 Mar. 6, 2008

(30) Foreign Application Priority Data
Sep. 4, 2006 (DE) ..................... 10 2006 041 836

(51) Int. Cl.
*G01G 19/00* (2006.01)
(52) U.S. Cl. ............... 177/25.13; 177/185; 177/199
(58) Field of Classification Search ............. 177/25.13, 177/185, 199, 200
See application file for complete search history.

(56) References Cited

U.S. PATENT DOCUMENTS

| 4,156,472 | A | * | 5/1979 | Kunz ................ 177/25.13 |
| 4,705,126 | A | * | 11/1987 | Naito ................ 177/50 |
| 4,790,398 | A | * | 12/1988 | Nobutsugu ............ 177/1 |
| 5,062,492 | A | * | 11/1991 | Inoue ................ 177/25.14 |
| 5,117,929 | A | * | 6/1992 | Nakamura et al. ........ 177/185 |
| 5,656,800 | A | * | 8/1997 | Naito et al. ........... 177/25.13 |
| 5,756,938 | A | * | 5/1998 | Kono et al. ........... 177/25.13 |
| 5,990,422 | A | * | 11/1999 | Komori et al. ......... 177/25.11 |
| 6,177,637 | B1 | * | 1/2001 | Evans ................ 177/25.13 |

FOREIGN PATENT DOCUMENTS

EP 0464223 A1 1/1992

OTHER PUBLICATIONS

"The Electrical Engineering Handbook", Richard C. Dorf, Ed., CRC Press, London, (c) 1993, pp. 1718-1719.*
"Systems Architecture: Hardware and Software in Business Information Systems", Stephen D. Burd, CTI, Cambridge, MA, (c) 1996, pp. 162-163.*

* cited by examiner

*Primary Examiner*—Randy W Gibson
(74) *Attorney, Agent, or Firm*—The Culbertson Group, P.C.

(57) ABSTRACT

A weighing device for a combination scale includes a force-sensing unit for converting a weight acting on a load sensor of the force-sensing unit into an analog electrical signal and an analog/digital converter to which the analog electrical signal is fed and which converts the analog electrical signal into a digital electrical signal. the weighing device further includes a controller for controlling the analog/digital converter and for additional digital processing of the digital values of the digital electrical signal fed to it. The weighing device has a synchronization output which is connected to the controller or to the analog/digital converter and to which a synchronization signal is fed that includes at least the information of the starting time points of the individual conversion processes performed by the analog/digital converter unit for determining a digital value of the digital electrical signal, and/or the weighing device has a synchronization input connected to the controller (13) or the analog/digital converter to which an external synchronization signal can be fed that includes at least the information of one or more desired starting time points for a conversion process to be performed by the analog/digital converter for determining a digital value of the digital electrical signal.

22 Claims, 2 Drawing Sheets

WEIGHING DEVICE, ESPECIALLY LOAD CELL FOR A COMBINATION SCALE

TECHNICAL FIELD OF THE INVENTION

The invention relates to a weighing device, especially a load cell for a combination scale, with a synchronization arrangement by which the measurements by the load cell may be synchronized with measurements provided by one or more additional load cells. In addition, the invention relates to weighing equipment with at least two such weighing devices, especially a combination scale.

BACKGROUND OF THE INVENTION

For weighing equipment in which a partial weight is determined by each of several weighing devices and a sum or difference weight is determined from the individual partial weights, as is the case, for example, in combination scales, there is often the demand, as is also the case for weighing equipment with a single weighing device, for fast and also high-precision determination of the partial weights or the sum or difference weight. However, when weighing equipment with a single weighing device, the measurement result can in particular be made incorrect by deviations in the weight forces acting on the cell, caused, for example, by vibrations or movements of the product to be weighed acting on the weighing device. When weighing equipment with several weighing devices, there is also the problem that the distribution of the total weight of the product on the individual weighing devices changes over time for products moving during the weighing process.

Such weighing devices are often constructed as load cells, which each determine by themselves a (partial) weight acting on them and which output an analog or digital signal corresponding to this weight. Digital load cells, which already output a digital value for the weight in units of weight as an output signal, are also designated as weighing modules.

For known, industrial combination scales, as described, for example, in U.S. Pat. No. 5,990,422, several sub-scales or load cells are arranged in series one after the other, often with weighing belt conveyors of different lengths, with which the product to be weighed is transported over the load sensor of the load cells. In the interest of the highest possible throughput of products to be weighed, for example, mail packages of different weights, each product to be weighed must be separated, if necessary, and moved at the highest possible, preferably constant speed over the weighing belt conveyors. If the concerned product is so long that it simultaneously lies on several weighing belt conveyors, then the total weight must be determined through the addition of the individual partial weights determined by each load cell. The sum or subtraction can be performed either in a central main controller, to which the individual load cells are connected (e.g., EP 0 319 202 A2), or indirectly in one or more selected load cells, which must then provide a corresponding computing capacity and intelligence (e.g., DE 102 21 628 A1).

In addition to a computational sum or difference formation of the individual partial weights, the total weight of a certain product can also be determined by means of a mechanical lever mechanism, which again loads a single force sensor on the output side (e.g., DE 669 521).

Performing a dynamic weighing process with high accuracy becomes more difficult the faster the product to be weighed is moved over the load sensor of one or more load cells. Accordingly, the measurement value detection must be performed within an ever shorter time span. Here, cases can occur in which a dynamic determination of the weight is no longer possible with sufficient accuracy, for example, for products with irregular geometric dimensions and irregular weight distribution. In this connection, it is known from DE 100 46 205 A1, for the dynamic weighing of products, to increase the throughput or the number of weighing processes per unit of time such that geometric data of the product to be weighed is determined before a weighing process and then a decision is made as to whether the product can (still) be weighed dynamically or whether the transport means for the dynamic scale for determining the weight of the concerned product should be stopped and the weighing process should be performed statically (semi-dynamic weighing of products). This method prevents a dynamic weighing process from being performed first and its failure being detected, because then the product must be transported back and weighed again statically, if necessary.

Instead of transitioning from dynamic to static weighing, the adjustment of the speed of the transport means of dynamic weighing equipment to certain parameters of the product or to the measurement result of the weight determination is also possible (e.g., EP 1 116 941). In principle, however, it is desired to prevent as much as possible any static weighing process and any reduction of the transport speed, because this would drastically reduce the throughput of the weighing equipment.

In addition to the negative effects on measurement accuracy generated on the side of the analog measurement value detection, it has been shown that the measurement accuracy for dynamic weighing of products by means of weighing equipment having two or more load cells, especially in the case of combination scales and multi-point scales, is further reduced by the digitization of the analog measurement value signals and the digital processing of the digital measurement values. This effect increases especially for increasing transport speed for the products to be weighed.

Therefore, the invention is based on the task of creating a weighing device, especially a load cell for a combination scale or multi-point scale, with which weighing equipment can be realized in a simple and economical way, in which several load cells are used for determining the weight of a product to be weighed, and which exhibits improved accuracy in the determination of the total weight of a product to be weighed. In addition, the invention is based on the task of creating such weighing equipment, especially dynamic weighing equipment, which has at least two weighing devices created in this way.

SUMMARY OF THE INVENTION

The invention starts from the knowledge that for weighing equipment, in which the partial weight signals of the individual weighing devices are not determined in analog and calculated by means of an analog computer to form the desired difference or sum signal, but instead in which the analog partial weight signals are first digitized and then the digitized and optionally averaged partial weight signals are added or subtracted, the problem arises that any time delay in the digitizing of the partial weight signals and any time delay in the calculation of digitized values of the partial weight signals leads to measurement error in the determination of the total weight. This has a strong effect in particular in precision measurements by means of fast, dynamic scales, when medium-sized and large masses are moved at high speed during the weighing process over the several weighing belt conveyors of a combination scale.

For example, if an object weighing 1500 g and 100 mm long that has a homogeneous weight distribution moves at a transport speed of 2 m/s over a combination scale with two weighing belt conveyors arranged one after the other (here, each transport conveyor acts on a separate weighing device), then the partial weight acting on a weighing device on each weighing device changes by 30 g per millisecond during the phase in which the weight of the object acts on both weighing devices. For a time delay of 1 ms between the partial weight values (for example, because the analog signal of one weighing device was sampled and digitized 1 ms later than the analog signal of the other weighing device), the partial weight value of one weighing device is determined to be 30 g too high or too low. For a maximum permissible error in the determination of the total weight of 0.1 g to 1.0 g, as is definitely realistic in practice, this would lead to impermissible deviations.

In principle, this problem also occurs in weighing equipment with several weighing devices (so-called multi-point weighing equipment), when the product to be weighed is displaced during the measurement value determination of the individual partial weights. This leads to the partial weights determined by the weighing devices changing over time, even when in this case, independent of a non-homogeneous weight distribution of a product to be weighed, there is always a linear and normally flat transition between the partial weights determined by the individual weighing devices. Such weighing equipment is described, for example, in EP 0 656 530 A1 or DE 102 21 628 A1.

A time offset of the partial weight values determined by the individual weighing devices can result as a constant delay, for example, due to filter propagation times or transient characteristics of the mechanical and electrical components of the weighing devices including their control behavior and also due to certain constant propagation times of software processes, and as a random delay or jitter, for example, due to the processing of software processes as a reaction to randomly occurring external events. Such an external event can be, for example, a communications request to a communications bus, with which the concerned weighing device that is running the software communicates with another weighing device or a higher-order unit. According to the invention, the weighing device has a synchronization output that is connected to the controller or the analog/digital converter and to which a synchronization signal is fed. This signal contains at least the information of the starting time points of the individual conversion processes performed by the analog/digital converter for determining each digital value of the digital electrical signal. This synchronization signal of the weighing device acting as a master weighing device can then be fed to one or more other weighing devices acting as slave weighing devices, in order to synchronize the conversion processes of the slave weighing devices performed by their analog/digital converters to the synchronization signal and thus to the conversion processes of the analog/digital converter of the master weighing device.

A weighing device acting as a slave weighing device has, according to the invention, a synchronization input, which is connected to the controller or the analog/digital converter and to which an external synchronization signal can be fed. This signal contains at least the information of one or more desired starting time points for each conversion process to be performed by the analog/digital converters for determining each digital value of the digital electrical signal. The analog/digital converter of the slave weighing device performs the conversion processing according to the external synchronization signal fed directly to it or according to the internal synchronization signal fed to it by the controller, wherein the controller derives this internal synchronization signal from the external synchronization signal fed to it and feeds it to the analog/digital converter.

In the preferred embodiment, the weighing device according to the invention is constructed so that it can function both as a master weighing device and also as a slave weighing device. For this purpose, a corresponding configuration can be provided by means of corresponding configuration means, for example, through software configuration, which can also be possible from the outside via an interface, or through hardware configuration, for example, by means of jumpers.

According to a preferred embodiment of the invention, the synchronization output is constructed as a separate output, to which the synchronization signal is fed in the form of a digital signal. In other words, the synchronization output should not be realized in the framework of a communications bus on which the synchronization signal is transmitted to the slave weighing device as a software instruction to be decoded. By using a separate synchronization output, to which the synchronization signal is fed exclusively, impermissible time deviations and delays in the transmission of the information concerning the starting time points of the analog/digital conversion processing performed in the master weighing device are prevented.

The analog/digital converter of a weighing device according to the invention can have a reset input, to which the external synchronization signal or the internal synchronization signal is fed, wherein the analog/digital converter begins after each event of the reset signal triggering a reset process with a conversion process, and for this purpose, if necessary, stops a currently running conversion process.

The controller of the weighing device can generate an essentially periodic internal synchronization signal and can feed this to the separate analog/digital converter and/or to the synchronization output. Obviously, however, the synchronization signal can also be generated by the analog/digital converter, which can have an internal oscillating circuit available from which the synchronization signal is derived, wherein the conversion processing performed by the concerned analog/digital converter can also be performed according to this synchronization signal.

If the external synchronization signal is not fed directly to the analog/digital converter, but instead to the controller, then the controller can synchronize the internal synchronization signal generated by it with the external synchronization signal fed to it.

The external synchronization signal can have a triggering event for each conversion process to be performed. This can be, for example, a falling or rising edge of a digital synchronization signal.

According to a preferred embodiment of the invention, the weighing device can have an input connected to the controller for feeding the external measurement process signal, wherein the controller determines one or more digital values of the digital electrical signal as relevant measurement values after detecting a starting event in the measurement process starting signal. The digital values can be stored in a memory designed for this purpose or can be immediately processed, for example, summed for forming an average value.

According to an embodiment, the controller can determine a predetermined number of digitized values, which are generated by means of a corresponding number of conversion processes, as relevant measurement values after detecting a starting event in the measurement process starting signal, wherein the conversion processing is performed according to the internal or external synchronization signal.

Instead of this, however, the controller can also be constructed so that it determines a number of digitized values, which are generated by means of a corresponding number of conversion processes, as relevant measurement values until it detects a stopping event in the measurement process signal after detecting a starting event in the external measurement process signal, wherein the conversion processes are performed according to the internal or external synchronization signal.

In both cases, a master measurement window is generated by means of the external measurement process signal, wherein digital measurement values determined by the weighing device within the master measurement window are used as relevant measurement values. In another embodiment, the controller in a master mode can use, as a first digital value, that analog/digital converted value whose associated conversion process was first to be started after detecting the starting event in the external measurement process starting signal or the analog/digital converted value whose associated conversion process was stopped first after the detection of the starting event in the external measurement process starting signal.

If the controller operates in a slave mode, then it can use those digital values that are offset by a number m of sampling time points in the direction of earlier sampling time points relative to the measurement values that were used as relevant values by this weighing device in the master mode, wherein the number is a whole number greater than or equal to one, preferably equal to one. In this way it can be taken into account that it is rarely possible to detect the presence of a starting event in the external measurement process signal absolutely simultaneously in several weighing devices, even if the external measurement process signal of each weighing device could be fed absolutely simultaneously, i.e., with no delay. In practice, however, such delays between the external measurement process signals fed to each weighing device do appear, also due to signal propagation times, filter propagation times, and the like. This produces a time offset of sampled values that were considered as relevant measurement values, and thus possibly produces insufficient accuracy for determining the total weight of the product to be weighed through the addition and/or subtraction of the partial weights.

Therefore, according to the invention, the weighing device can have an output connected to the controller for the output of a dependent measurement process signal to at least one other weighing device, wherein in the master mode the controller also generates a starting event as a function of the measurement process signal after detecting a starting event in the measurement process signal. In this way, as a function of the measurement process signal, which can be fed to a weighing device operating in the slave mode, a slave measurement window is defined which is delayed in time relative to the master measurement window.

In this way, the delay between the detection of the starting event in the external measurement process signal and the generation of the starting event as a function of the measurement process signal can be selected so that the slave measurement cell under all circumstances would detect a series of successive sampled values, which are delayed by a number m of sampling time points relative to the sampled values detected by means of the master measurement window of the master weighing device, during the slave measurement window.

However, because the slave measurement cell is to detect measurement values detected simultaneously in comparison to the master weighing device, the controller uses as relevant measurement values in a slave mode the digital values which are offset by a number m of sampling time points in the direction of earlier sampling time points relative to the measurement values that the slave measurement cell would use as relevant measurement values in the master mode (as a reaction to the dependent measurement process signal fed to it), wherein the number m is a whole number greater than or equal to one, preferably equal to one.

The dependent measurement process signal is here generated by the master weighing device so that the starting event in the dependent measurement process signal lies only after the starting time point of the external or internal synchronization signal for the subsequent conversion process following the detected starting event in the measurement process starting signal, but before the next starting time point of the external or internal synchronization signal. In this case, a delay of the master weighing device by m=1 is produced in the slave measurement window of the slave weighing device relative to the master measurement window of the master weighing device.

Obviously, the starting event in the dependent measurement process signal can also lie after the starting time point of the external or internal synchronization signal for the following conversion process following the detected starting event in the external starting signal, but before the nth next starting time point of the external or internal synchronization signal, wherein n is greater than 2. In this case, the slave measurement window of the slave weighing device is delayed by m=n−1 relative to the master measurement window of the master weighing device.

According to one embodiment of the invention, the weighing device has a measurement value output which is connected to the controller and with which the controller can transmit to another unit each relevant digital measurement value or one digital value determined from several relevant digital measurement values. For this purpose, the controller can sum or average the several relevant digital measurement values and transmit the sum or average to the other unit. In weighing equipment with several such weighing devices, the synchronization signals can be transmitted from a slave weighing device operating in the master mode either directly or indirectly to the other weighing devices operating in the slave mode. Instead of a weighing device operating in the master mode, however, a separate unit for generating the synchronization signals can also be used.

In weighing equipment with several such weighing devices, the relevant digital measurement values determined by each weighing device, the final value, a weight, or an average value determined from these measurement values can be transmitted to one or more defined weighing devices. The one or more weighing devices then determine, for example, through addition and/or subtraction of the partial weight values determined by the weighing devices, a sum or total weight value.

These and other advantages and features of the invention will be apparent from the following description of the preferred embodiments, considered along with the accompanying drawings.

DESCRIPTION OF ILLUSTRATIVE EMBODIMENTS

Figure 1:
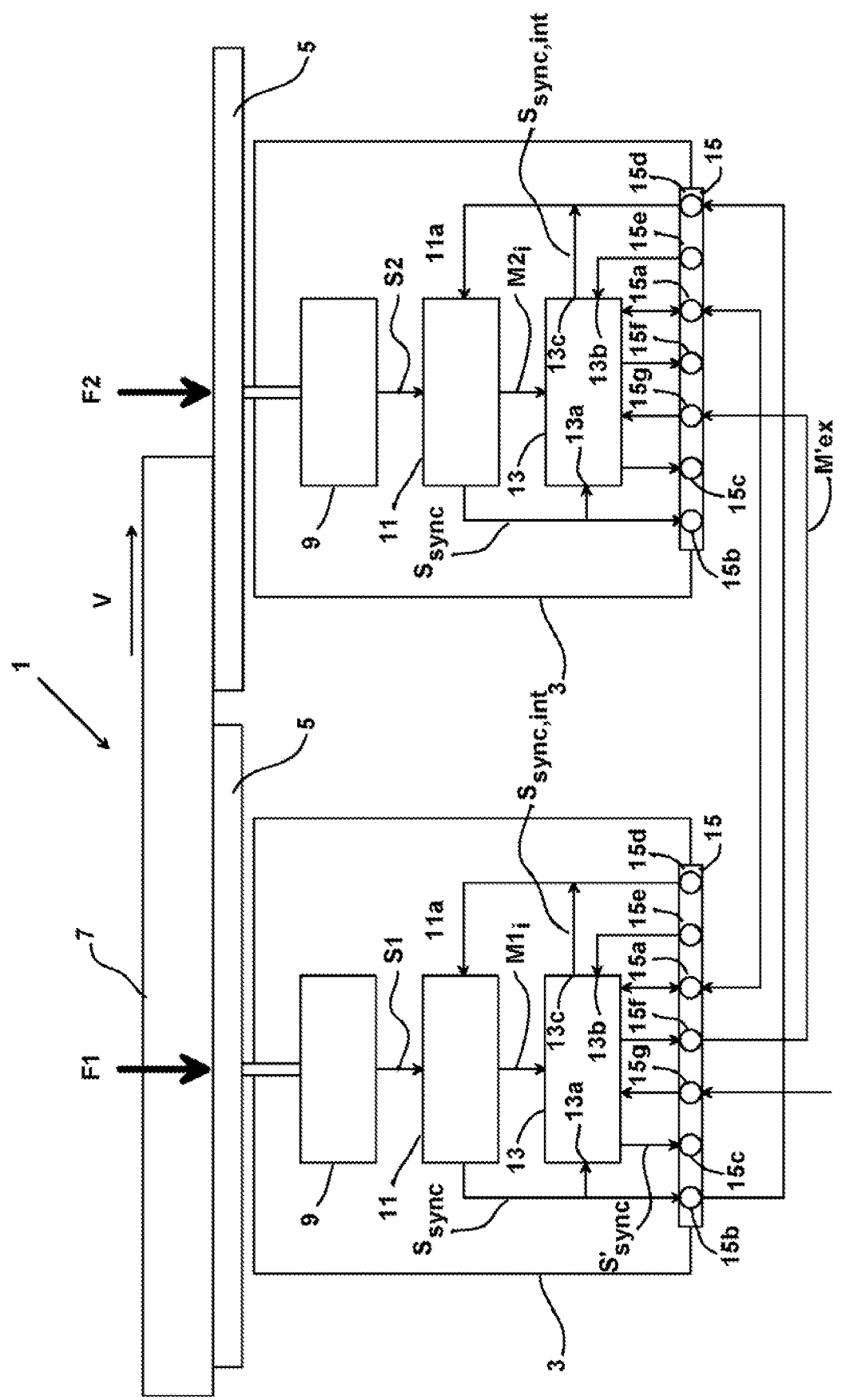
FIG. 1 is a schematic block diagram of weighing equipment according to the invention with two weighing devices according to the invention.

The weighing equipment 1 shown schematically in FIG. 1 is constricted as a combination scale and comprises two weighing devices, which are constructed as load cells 3 and which each have available a load sensor 5 constructed as a conveyor belt. Basically, however, the principle described with reference to the figures can obviously also be transferred to weighing devices of any kind.

On the load sensors 5 of the combination scale 1, a product 7 to be weighed can be transported in the direction indicated by the arrow, wherein the weighing equipment should determine the total weight of the product 7. For this purpose, the partial weights F1 and F2 are determined by means of the load cells 3 and combined computationally to form the total weight FG=F1+F2. The partial weights F1 and F2 exerted on the load sensors 5 each act on a force sensor unit or a force sensor 9 of the appropriate load cell 3, respectively.

Each of the force sensors 9 converts the weight F1, F2 exerted on the appropriate load sensor into an analog measurement signal S1 or S2, which is fed to an analog/digital converter 11. The analog/digital converters 11 can comprise all of the components that are necessary for the analog/digital conversion of the analog measurement signals, and can be constructed in a known way.

The analog/digital converters 11 typically sample each measurement signal S1, S2 at essentially equidistant time intervals and convert the corresponding sampled value into a digital measurement value M$1_i$ or M$2_i$ of a corresponding digital signal M1 or M2. Below, the analog/digital converted measurement value M$1_i$ or M$2_i$ corresponding to an (analog) sampled value is also designated as a sampled value. The digital measurement values M$1_i$ and M$2_i$ are then each transmitted to a controller 13 and stored and/or processed by this controller and/or transmitted to another unit, for example, to a higher-order processing unit or to another load cell. All of the inputs and/or outputs of the measurement cells 3 can be combined, as shown in FIG. 1, at an interface 15. Obviously, however, separate output ports or interfaces could also be provided for the concerned inputs and/or outputs. In the embodiment shown in FIG. 1, the communications between the measurement cells 3 takes place via the preferably bidirectional communications ports 15a. These can be constructed for connecting the measurement cells 3 to each other or also to one or more other units by means of a bus system.

To maximize prevention of measurement errors or impermissibly large measurement inaccuracies in the determination of the partial weights F1, F2 due to a time offset between the sampling time points of the analog measurement signals S1, S2, it is necessary to precisely synchronize the sampling time points of the analog/digital converters as much as possible. For this purpose, each analog/digital converter can have available a corresponding internal controller (not shown), for example, a high-frequency oscillating circuit, whose output signal is stepped down in its frequency by means of a frequency divider until a digital signal is produced that has a rising or falling edge which is then used as a starting signal for a conversion process in predetermined, equidistant time intervals. For example, this digital signal can have a period of 1 ms, so that the analog/digital converter delivers a digitized sampled value at an interval of 1 ms. As shown in FIG. 1, this digital signal can be fed as the synchronization signal $S_{sync}$ to the output port 15b of the interface 15. In addition, the synchronization signal $S_{sync}$ can also be fed to the controller 13 at an input port 13a. The controller can then further process the signal $S_{sync}$ fed to it, for example, whose frequency is to be reduced even further when a synchronization of the starting time points of the analog/digital conversion processes of another load cell is not necessary for each conversion process, because the concerned analog/digital converter 11 is also automatically triggered at approximately identical time intervals.

The synchronization signal $S'_{sync}$ processed by the controller 13 is also fed as needed to the output port 15c of the interface 15.

The embodiment of weighing equipment 1 shown in FIG. 1 shows load cells 3 that have identical constructions and can be used universally. They have available not only the means or signals and signal inputs and/or outputs absolutely necessary for realizing the shown weighing equipment 1, but also means or signals and signal inputs and/or outputs with which additional embodiments can be realized.

For example, in the embodiment of the weighing equipment 1 shown in FIG. 1, the synchronization signal $S_{sync}$ is fed via the output port 15b of the first load cell 3 to the input port 15d, and thus to the reset input 11a of the analog/digital converter 11, of the second load cell 3. In this way, each conversion process of the analog/digital converter 11 of the second load cell 3 is synchronized with the concerned conversion process of the analog/digital converter 11 of the first load cell 3.

In another embodiment, instead of the synchronization signal $S_{sync}$, the synchronization signal $S'_{sync}$ is fed to the other load cell 3, that is, the output port 15c of the first load cell 3 is connected to the input port 15d of the second load cell 3. However, if the analog/digital converter 11 of the second load cell 3 is not in the position to process the synchronization signal $S'_{sync}$ because it requires a synchronization signal that has a starting signal for each conversion process to be performed, then the synchronization signal $S'_{sync}$ can also be fed to the input port 15e of the interface 15 and via this to an input port 13b of the controller 13. The controller 13 can then generate on its side, for example by means of a PLL circuit, an internal synchronization signal $S_{sync,int}$ with duplicated frequency and can feed it to the analog/digital converter 11. This is shown in FIG. 1 by the arrow between an output port 13c of the controllers 13 and the signal line between the input port 15d of the interface 15 and the input port 11a of the analog/digital converter 11. Obviously, however, a separate signal line can also be provided for this purpose between the output port 13c of the controllers 13 and a corresponding additional input port of the analog/digital converters 11.

Through the measures and means described above, a very good synchronization of the conversion processes taking place in the analog/digital converters 11 can be achieved. In practice, the maximum time difference still occurring in the sampling of the analog measurement signals S1, S2 equals a period of the signal of the high-frequency oscillating circuit, which is contained in the analog/digital converters 11 or whose signal is fed to the analog/digital converters 11, and is on the order of magnitude of a few tens of nanoseconds.

In order to realize this accuracy, one strives to realize those parts of the signal processing that create the synchronization of the analog/digital converters 11 through hardware, or through software processes running in the controller 13 with a very high priority.

The sampling and digitizing of the analog measurement signals S1, S2 can be performed continuously, for example, with a constant period of 1 ms. The digitized measurement values $M1_i$ or $M2_i$ can be stored in the concerned controller, for example, in a memory, in which only the last z digital measurement values $M1_i$ or $M2_i$ are stored. The controller can also perform processing on the measurement values $M1_i$ or $M2_i$ and transmit a corresponding result, for example, an average over a certain number of measurement values, to another unit. This other unit can be the second load cell or also a higher-order unit. Obviously, the currently detected digital measurement values $M1_i$ or $M2_i$ can also be transmitted to such another unit, which then performs appropriate processing. The digital measurement values $M1_i$ or $M2_i$, or values calculated from these measurement values, can be transmitted via the communications port 15a of the interfaces 15 of the measurement cells 3. Because such communications do not have to be performed in real time, the software processes or routines can have a low priority.

In addition to the synchronization of the conversion processes running in the analog/digital converters 11 described above, it must also be determined which of the digital measurement values $M1_i$ or $M2_i$ is to be used for determining the total weight. For this purpose, the length of a product 7 to be weighed that has just been fed to the weighing equipment 1 can be determined, for example, by means of a not-shown photo sensor, and from this an external measurement process signal $M_{ex}$ can be generated for the weighing equipment 1. The measurement process signal $M_{ex}$ is fed to the first load cell 3 on the input port 15g and has a starting event that sets the time point at which the actual weight determination is to begin.

Figure 2:
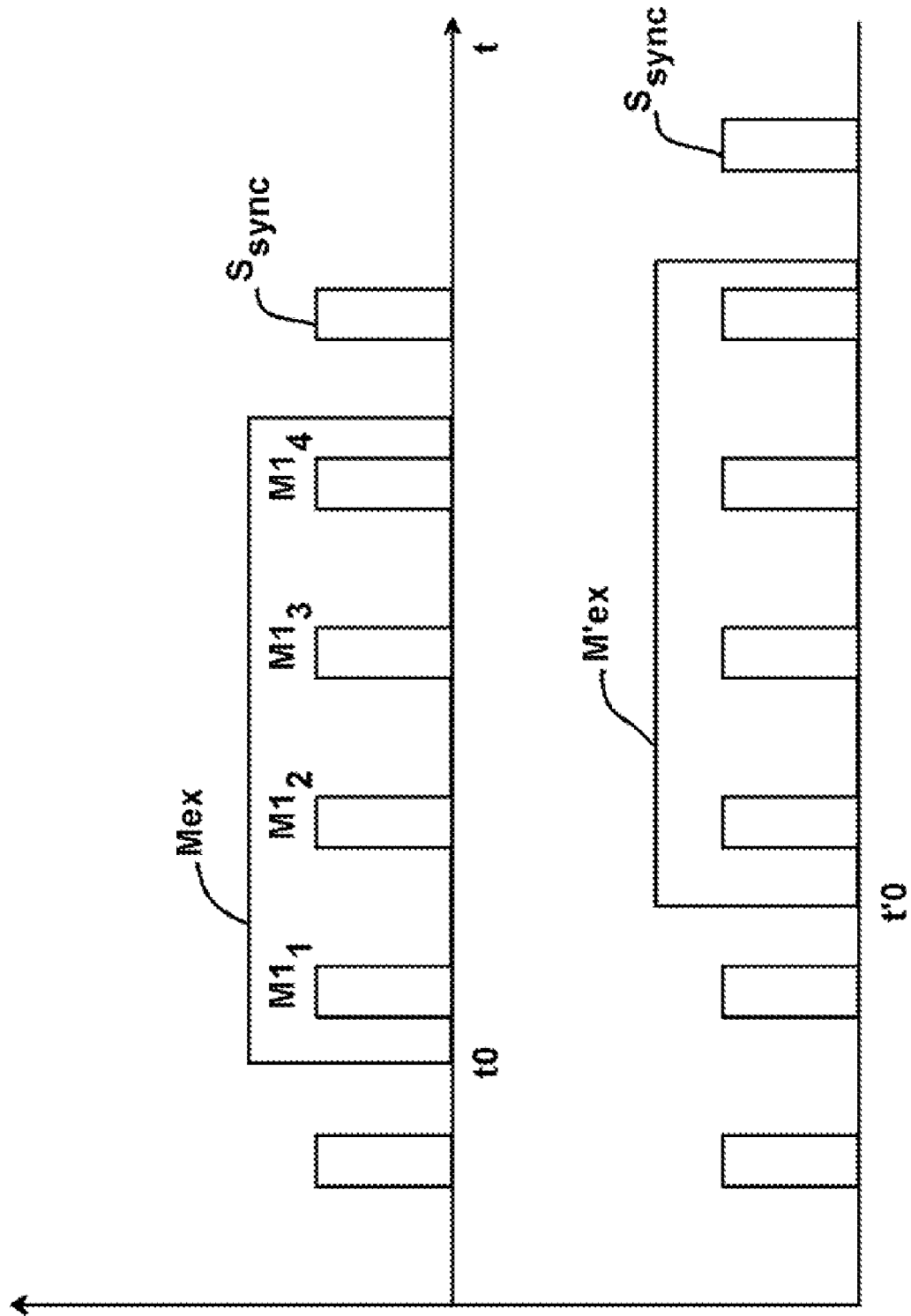
FIG. 2 is a diagram with signals of the weighing equipment in FIG. 1 that are relevant for the function according to the invention, especially the synchronization signal and the external measurement process signal and the dependent measurement process signal.

FIG. 2 shows the applicable functioning of the first load cell 3, which operates in a master mode. Suitable and known configuration means can be provided for activating the master mode, for example, a hardware jumper or the feeding of an appropriate software instruction via the communications port 15a.

FIG. 2 shows, first, the synchronization signal $S_{sync}$, wherein it is assumed in the shown embodiment that each rising edge of the pulses of the synchronization signal $S_{sync}$ triggers the start of a conversion process of the analog/digital converter 11. The corresponding converted digital sampled value $M1_i$ is then available after a certain time span has elapsed. Second, FIG. 2 shows the external measurement process signal $M_{ex}$, which has, at a time point $t_0$ as the starting event, a rising edge representing the starting time point for the weighing process to be performed.

The first load cell 3 operating in master mode uses the first four digital measurement values $M1_1, M1_2, M1_3, M1_4$, whose conversion processes were started after the time point $t_0$, as measurement values relevant for the measurement to be performed. For reasons of simplicity, the reference symbols of the measurement values $M1_1, M1_2, M1_3, M1_4$ are included in FIG. 2 above the pulse of the synchronization signal $S_{sync}$ starting the relevant conversion process, in which way a corresponding allocation is signaled.

In the master mode, the controller 3 sums the measurement values $M1_1, M1_2, M1_3, M1_4$ (and optionally divides by four for forming an average for the partial weight F1) and assigns this result to a value for the partial weight F1, optionally taking into consideration a connection specification and after possible correction for additional influences (e.g., temperature effects, non-linearities in the load cells, etc.).

The four measurement values can be used either by counting a given number of conversion processes (e.g., the starting events in the synchronization signal) or by the additional determination of a stopping event in the external measurement process signal, for example, as its falling edge. A master measurement window of the external measurement process signal can be determined in both ways.

Because synchronization of the conversion processes in the two load cells 3 is not possible without any deviations—even if in practice only small deviations appear—the case can certainly arise that when the external measurement process signal $M_{ex}$ is fed to both load cells, the starting event lies in the external measurement process signal between two slightly offset starting events (rising edges) of the two load cells in the synchronization signal of the two load cells. In this case, digital measurement values are used for determining the partial weights of the two load cells 3 that are offset unintentionally about a sampling point. This would lead to an impermissibly large measurement error, as discussed above.

To eliminate these possible errors, the controller 13 of the first load cell generates from the external measurement process signal a dependent measurement process signal ($M'_{ex}$), wherein the starting event is then generated in the dependent measurement process signal ($M'_{ex}$) only when the conversion process following the starting signal in the external measurement process signal is started in the first load cell 3. In the first load cell 3, if the starting time points for the conversion processes are identical to the starting events in the synchronization signal $S_{sync}$, then the controller 13 of the first load cell 3 can use the starting event following the detection of the starting event in the external measurement process signal $M_{ex}$ for a conversion process (e.g., the rising edge) as a triggering moment for generating the starting event in the dependent measurement process signal $M'_{ex}$. In addition, due to the maximum synchronization error (maximum time deviation to be expected between the starting time points for the conversion processes in the two load cells) it is necessary to delay the starting event in the dependent measurement process signal $M'_{ex}$ by the maximum synchronization error relative to the starting signal in the measurement process signal $M_{ex}$.

The dependent measurement process signal $M'_{ex}$ generated in this way is fed to the output port 15f of the interface 15 of the first load cell 3, which is connected to the input port 15g of the interface 15 of the second load cell 3.

The load cell 3 operating in slave mode evaluates the dependent measurement process signal $M'_{ex}$ fed to it and determines from this signal the digital measurement values $M2_i$ relevant for performing the measurement for determining the weight F2. The second load cell 3 knows that, due to the activated slave mode, the digital measurement values $M2_2, M2_3, M2_4, M2_5$ contained in the slave measurement window of the measurement process signal may not be used for determining the measurement result, but instead that a time offset of m sampling periods known to it must be taken into account. In the shown case, the time offset is equal to one sampling period. Consequently, the second load cell 3 uses a corresponding number of measurement values $M_i$ that are shifted relative to the measurement values $M_i$ within the slave measurement window by an offset of m=1 in the direction of earlier measurement values, that is, the correct measurement values $M2_1, M2_2, M2_3, M2_4$ that were determined simultaneously with the measurement values $M1_1, M1_2, M1_3, M1_4$ of the first load cell 3 up to the maximum possible synchronization error (deviation between the starting time points in the synchronization signals).

The controller of the second (slave) load cell 3 can in turn determine the number of measurement values $M2_i$ relevant for the measurement by counting a given number of sampling processes or measurement values or by detecting a stopping event in the dependent measurement process signal, which is generated by the first load cell 3.

Obviously, this principle explained above with reference to weighing equipment 1 with two load cells could also be transferred to weighing equipment with three or more load cells. The load cells are connected analogously, wherein one load cell operates in master mode and the other load cells operate in slave mode.

The synchronization signal $S_{sync}$ or $S'_{sync}$ can be fed directly to the slave load cells from the master load cell or handed off from one slave load cell to the next slave load cell in the form of a chain. For this purpose, the output port 15b or 15c (according to which type of synchronization signal is to be handed off) can be connected to the input port 15d or 15e of the following slave load cell.

For determining the total weight $F_G$, the partial weight determined by the individual load cells 3 in the above way can be transmitted via the communications port 15a to a single predetermined load cell or to several predetermined load cells or to all of the other load cells or else to a higher-order unit. This single load cell or these several load cells or the higher-order unit then performs the necessary calculations. If the total weight is determined by several load cells, then the results can be monitored, e.g., with a plausibility test. For this purpose, the results could be transmitted to a single load cell or to a higher-order unit, wherein the result is recognized only when a certain number of results are in agreement.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A weighing device including:
   (a) a load sensor for receiving a weight to be measured;
   (b) a force sensor operatively connected to the load sensor for producing an analog signal representative of the weight acting on the load sensor;
   (c) an analog/digital converter having a force sensor input connected to receive the analog signal and also having a reset input, the analog/digital converter for performing a conversion process responsive to a signal at the reset input, the conversion process converting the analog signal into a digital signal;
   (d) a controller connected to receive the digital signal through a data output of the analog/digital converter; and
   (e) a synchronization input in position on the weighing device to receive an external synchronization signal which originates externally to the weighing device, wherein the reset input of the analog/digital converter is either connected directly to the synchronization input or is connected indirectly to the synchronization input through an intermediate component of the weighing device.

2. The weighing device of claim 1 wherein the reset input of the analog/digital converter is connected directly to the synchronization input so that the external synchronization signal is applied to the reset input of the analog/digital converter.

3. The weighing device of claim 1 wherein the reset input of the analog/digital converter is indirectly connected to the synchronization input through the controller.

4. The weighing device of claim 1 constructed as a standalone load cell.

5. The weighing device of claim 1 further including a synchronization output connected to an additional output of the analog/digital converter or to the controller so as to receive an internal synchronization signal to be communicated to an additional weighing device, the internal synchronization signal being generated internally to the weighing device.

6. The weighing device of claim 5 wherein the controller or the analog/digital converter generates the internal synchronization signal.

7. The weighing device of claim 6 wherein the controller receives the external synchronization signal and synchronizes the internal synchronization signal with the external synchronization signal.

8. The weighing device of claim 1 further including an external measurement process signal input connected to the controller and wherein the controller determines at least one digital value of the digital signal received from the analog/digital converter as a relevant measurement value responsive to a starting event in a measurement process signal received at the external measurement process signal input.

9. The weighing device of claim 8 wherein the controller takes a predetermined number of digital values of the digital signal received from the analog/digital converter as respective relevant measurement values, wherein each respective digital value is generated by means of a corresponding conversion process performed by the analog/digital converter, and wherein each conversion process is performed in response to the external synchronization signal.

10. The weighing device of claim 8 wherein the number of digital values of the digital signal received at the controller from the analog/digital converter taken as respective relevant measurement values is determined by a stopping event in the measurement process signal, wherein each respective digital value is generated by means of a corresponding conversion process performed by the analog/digital converter, and wherein each conversion process is performed in response to the external synchronization signal.

11. The weighing device according to claim 8 wherein when the controller is operated in a slave mode the relevant measurement values are digital values of the digital signal received at the controller from the analog/digital converter which are offset by a number m of sampling time points in the direction of earlier sampling time points relative to the values used as relevant measurement values in a separate weighing device operated in a master mode, wherein the number m is a whole number greater than or equal to one.

12. The weighing device of claim 8 further including a process signal output connected to the controller for the output of a dependent measurement process signal to at least one other weighing device, wherein the controller in a master mode generates a starting event in the dependent measurement process signal after detecting the starting event in the measurement process signal.

13. The weighing device of claim 12 wherein the controller generates the starting event in the dependent measurement process signal after a starting time point of the external synchronization signal or an internal synchronization signal following the detected starting event in the external measurement process signal.

14. The weighing device of claim 13 wherein the controller also delays the starting event in the dependent measurement process signal by a fixed delay time that is greater than a maximum expected synchronization error.

15. The weighing device of claim 13 wherein the controller generates the starting event in the dependent measurement process signal before the nth starting time point of the external synchronization signal or the internal synchronization signal following the detected starting event in the measurement process starting signal, wherein n is a whole number greater than or equal to two.

16. The weighing device of claim 12 wherein the controller generates a stopping event in the dependent measurement process signal after detecting a stopping event in the external measurement process signal.

17. The weighing device of claim 1 further including a measurement value output connected to the controller, and with which the controller can transmit to another weighing device one or more digital values of the digital signal or one or more digital values derived from the digital signal.

18. The weighing device of claim 1 wherein the controller determines a digital final value by summing or averaging two or more digital values of the digital signal.

19. A weighing apparatus including:
(a) a first weighing device, the first weighing device including,
   (i) a first load sensor for receiving a first weight to be measured;
   (ii) a first force sensor operatively connected to the first load sensor for producing a first analog signal representative of the first weight acting on the first load sensor;
   (iii) a first analog/digital converter having a force sensor input connected to receive the first analog signal, the first analog/digital converter for performing a conversion process responsive to a synchronization signal, the conversion process converting the first analog signal into a first digital signal;
   (iv) a first controller connected to receive the first digital signal from a data output of the first analog/digital converter;
   (v) a synchronization signal generating device for generating the synchronization signal; and
   (vi) a synchronization output positioned on the first weighing device to provide the synchronization signal as an output to at least one other weighing device, and (b) a second weighing device, the second weighing device including,
   (i) a second load sensor for receiving a second weight to be measured;
   (ii) a second force sensor operatively connected to the second load sensor for producing a second analog signal representative of the second weight acting on the second load sensor;
   (iii) a second analog/digital converter having a force sensor input connected to receive the second analog signal and also having a reset input, the second analog/digital converter for performing a conversion process responsive to a signal at the reset input, the conversion process of the second analog/digital converter converting the second analog signal into a second digital signal;
   (iv) a second controller connected to receive the second digital signal; and
   (v) a synchronization input connected to receive the synchronization signal generated by the first weighing device, wherein the reset input of the second analog/digital converter is either connected directly to the synchronization input or is connected indirectly to the synchronization input through an intermediate component of the second weighing device.

20. The weighing apparatus of claim 19 wherein the first analog/digital converter includes a respective reset input and wherein the first weighing device further includes:
(a) a respective synchronization input in position on the first weighing device to receive an external synchronization signal which originates externally to the first weighing device; and
(b) wherein the reset input of the first analog/digital converter is either connected directly to the synchronization input of the first weighing device or is connected indirectly to the synchronization input of the first weighing device through an intermediate component of the first weighing device.

21. The weighing apparatus of claim 19 wherein:
(a) the first weighing device includes a first output for outputting a digital value of the first digital signal or a digital value derived from the first digital signal; and
(b) the second weighing device includes a second output for outputting a digital value of the second digital signal or a digital value derived from the second digital signal.

22. The weighing apparatus of claim 19 wherein one of the first weighing device or the second weighing device is connected to receive a digital value from the other one of the first weighing device or the second weighing device for producing a final weight value.

* * * * *